United States Patent
Beaudet et al.

(10) Patent No.: US 6,637,925 B1
(45) Date of Patent: Oct. 28, 2003

(54) HAND HELD ELECTRICAL MIXING BEATER

(75) Inventors: Jean-Yves Beaudet, Haleine (FR); Marc Marriere, Ambrieres les Vallees (FR)

(73) Assignee: SEB S.A., Ecully (FR)

(*) Notice: Subject to any disclaimer, the term of this patent is extended or adjusted under 35 U.S.C. 154(b) by 0 days.

(21) Appl. No.: 10/088,362

(22) PCT Filed: Sep. 15, 1999

(86) PCT No.: PCT/FR00/02571

§ 371 (c)(1),
(2), (4) Date: Mar. 18, 2002

(87) PCT Pub. No.: WO01/19225

PCT Pub. Date: Mar. 22, 2001

(30) Foreign Application Priority Data

Sep. 16, 1999  (FR) .......................................... 99 11623

(51) Int. Cl.[7] .................................................. B01F 7/00
(52) U.S. Cl. ........................ 366/129; 366/206; 366/344; 366/601
(58) Field of Search ................................ 366/129, 197, 366/206, 199, 331, 601, 344, 343, 342; 310/50

(56) References Cited

U.S. PATENT DOCUMENTS

| | | | |
|---|---|---|---|
| 3,328,001 A | * | 6/1967 | Zasadny et al. ............. 366/129 |
| 3,533,600 A | * | 10/1970 | Gerson ....................... 366/129 |
| 3,595,093 A | * | 7/1971 | Du Bois et al. ............. 366/129 |
| 3,604,114 A | * | 9/1971 | Swanke et al. ............. 30/277.4 |
| 3,619,754 A | * | 11/1971 | Fuchs ......................... 366/129 |
| 5,316,382 A | | 5/1994 | Penaranda et al. .......... 366/129 |
| 5,803,598 A | * | 9/1998 | Harry et al. ................. 366/129 |
| 5,871,278 A | * | 2/1999 | Harry et al. ................. 366/129 |
| 6,234,663 B1 | * | 5/2001 | Lecerf et al. ................ 366/129 |

FOREIGN PATENT DOCUMENTS

| | | |
|---|---|---|
| DE | 41 42 074 | 6/1993 |
| WO | WO 01/19225 | * 3/2001 |

* cited by examiner

Primary Examiner—Tony G. Soohoo
(74) Attorney, Agent, or Firm—Young & Thompson

(57) ABSTRACT

Handheld electric beater-mixer includes a drive motor, two rotatable coupling devices associated with the motor and adapted to receive respectively a whisk and a mixer foot, and an electric switch actuated by a finger piece mounted rotatably on a rotational axle and occupying a stopped position and several switched positions for the continuous operation of the motor. A spiral spring is mounted concentrically to the rotational axle of the finger piece and has a free end and a fixed end connected to the finger piece, and a safety member is movably mounted between a rest position in the presence of the mixer foot and in which the free end of the spring rests against an abutment on the safety member so as continuously to stress the spring, and the retracted position in the presence of the whisk and in which the abutment of the safety member is removed so as continuously to relax the spring.

5 Claims, 6 Drawing Sheets

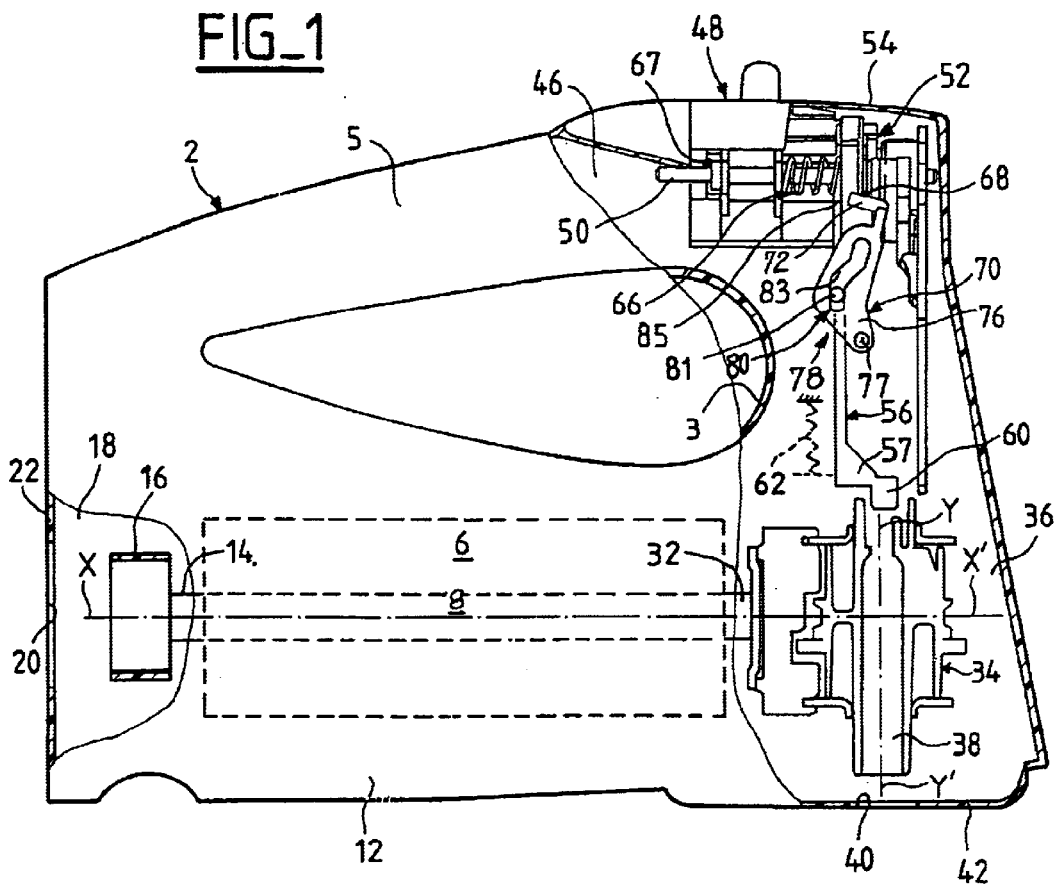
FIG_1
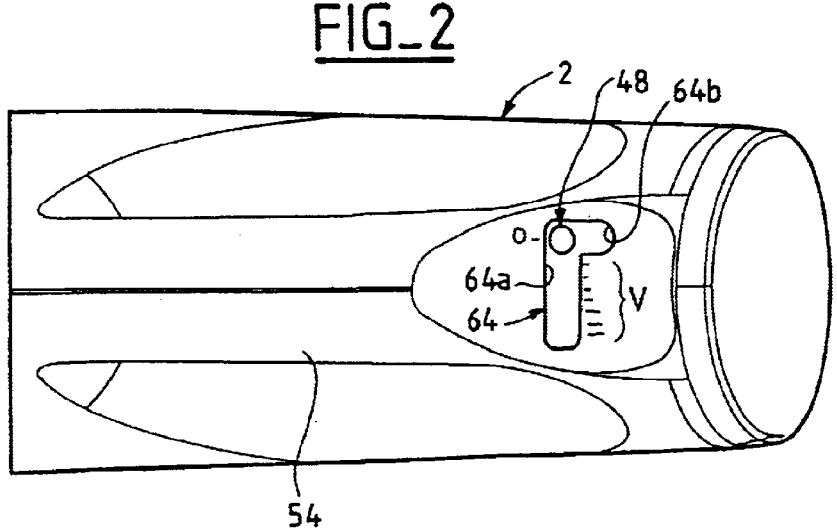
FIG_2

FIG_3

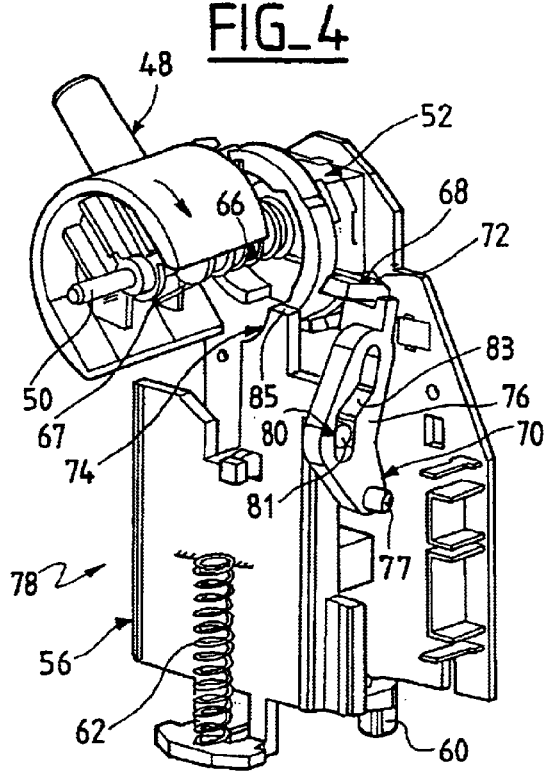
FIG_4
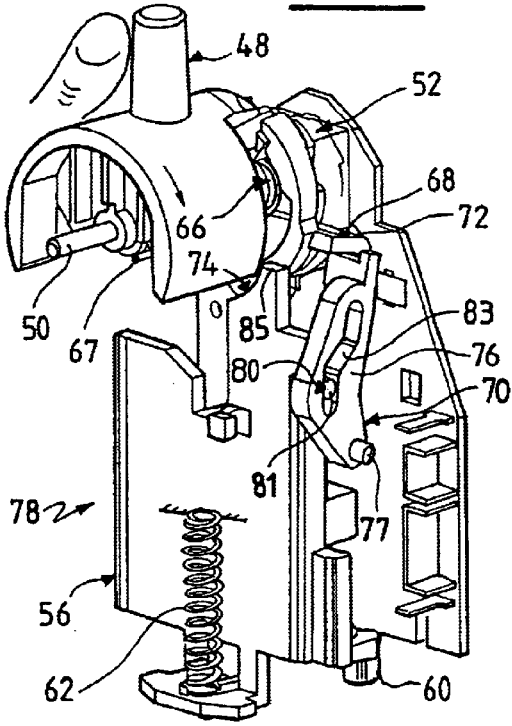
FIG_5
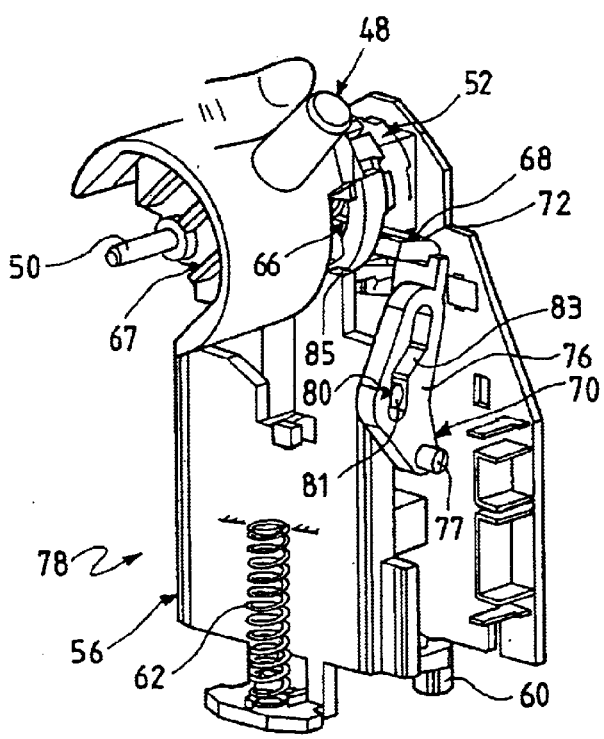
FIG_6

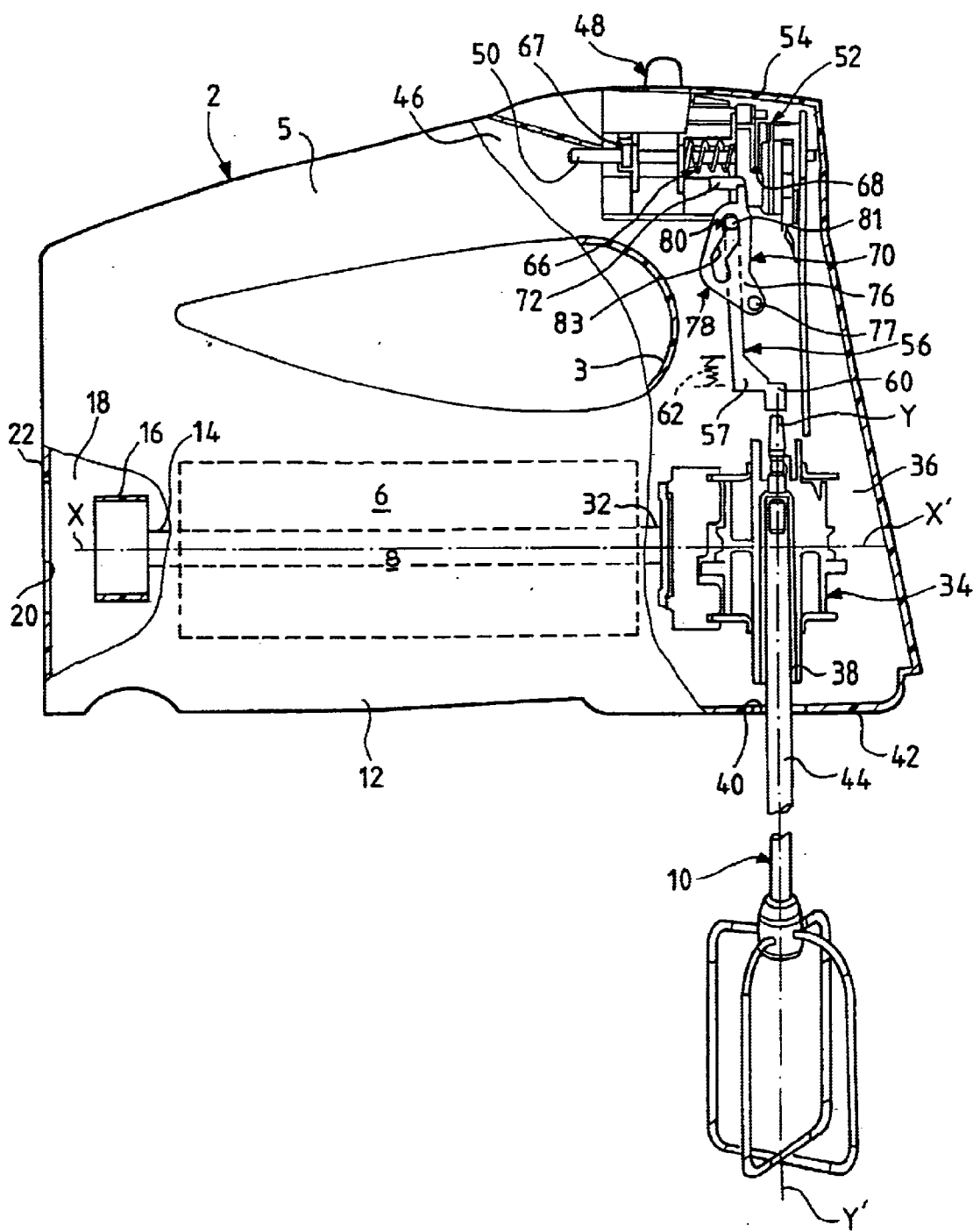
FIG_7

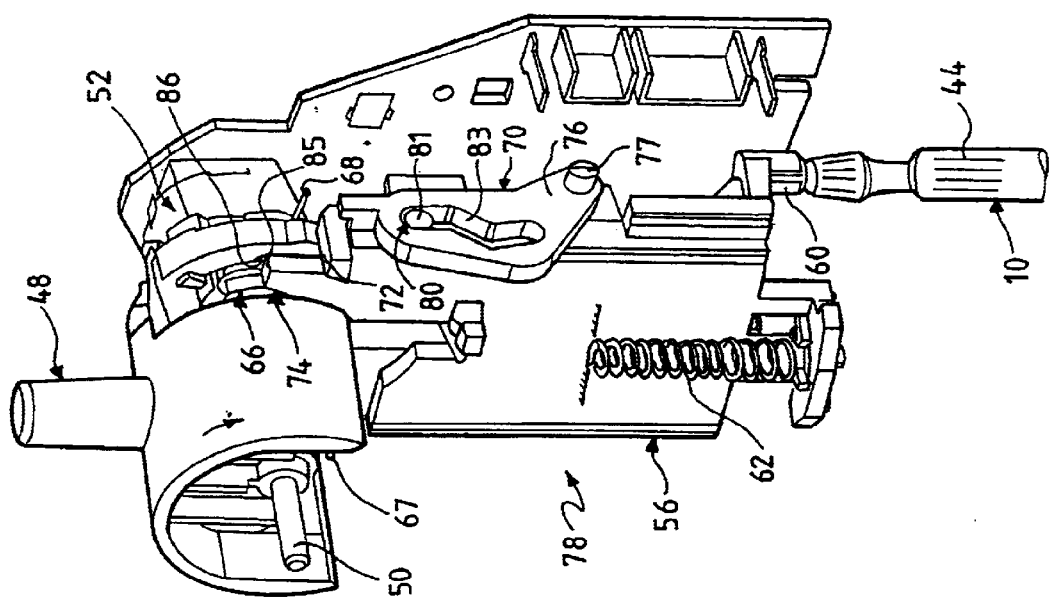
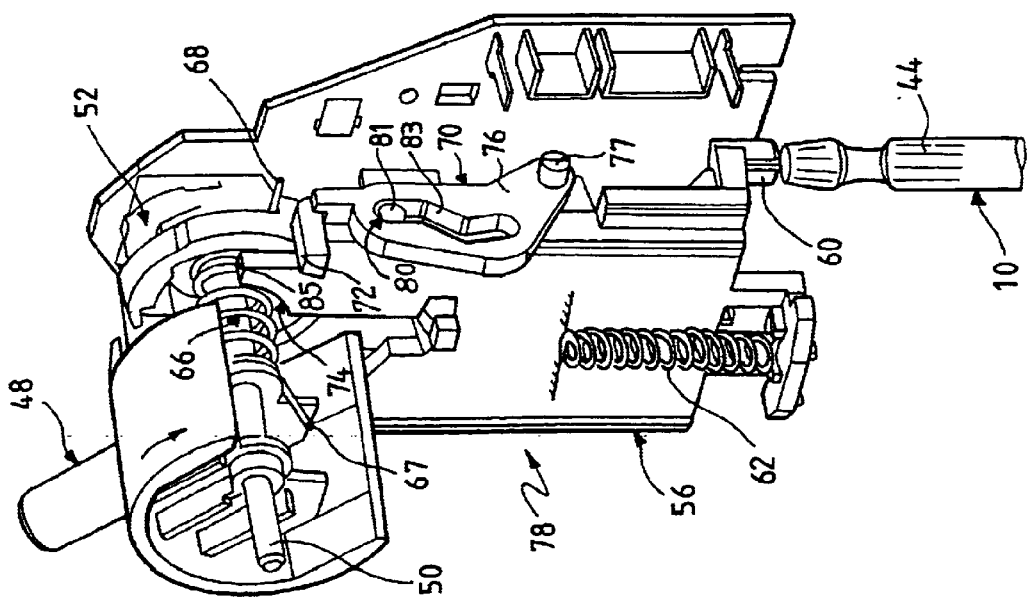

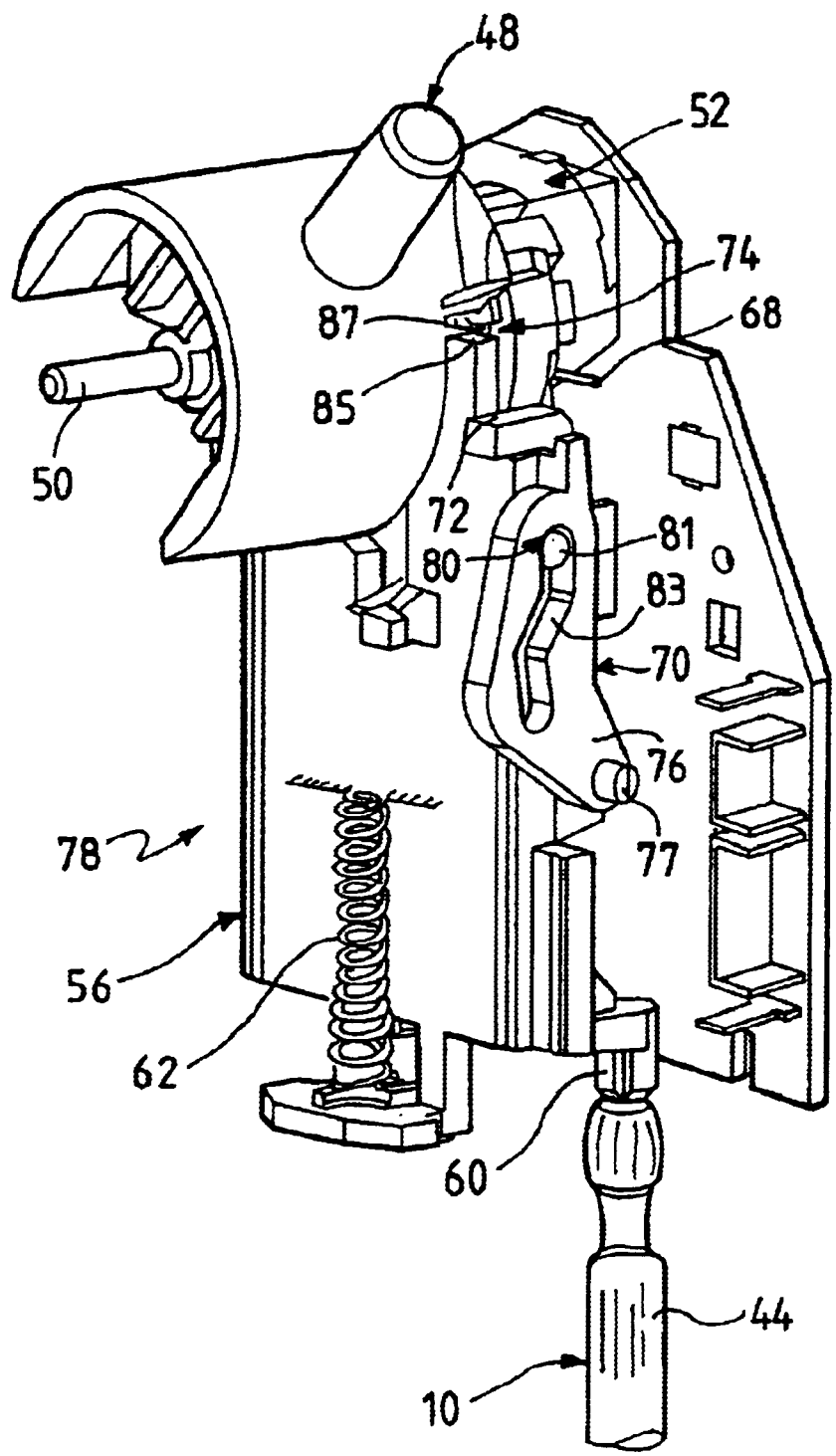
FIG_10

HAND HELD ELECTRICAL MIXING BEATER

The present invention relates to a handheld electric eater-mixer, particularly a household beater-mixer, adapted to drive selectively at least one so-called beating accessory such as, for example, a whisk, or a so-called mixing accessory turning at high speed such as, for example, a mixing foot, and comprising a body containing an electric drive motor, two rotatable coupling devices connected to the shaft of the motor and adapted to receive, via respectively two engagement passages opening into the body, the beating accessory and, respectively, the mixing accessory, and a control switch for the electric motor which is actuated by an actuating finger piece mounted rotatably on a rotation axle so as to occupy a stop position in several switched positions for continuous operation of the motor.

There is meant by beating accessory a working tool of the whisk or kneading type, and by mixing accessory a working tool turning at high speed of the mixing foot type with a rotatable knife.

In a known apparatus of this type, the actuating finger piece is adapted to control the same control switch for continuous operation of the motor, not only in case of use of the beating accessory but also in the case of the mixing accessory; in these two cases of use, the actuating finger piece is locked in each of its switched positions, permitting the continuous operation of the motor. However, in the presence of the mixing accessory whose working tool of the knife type is adapted to turn at high speed, it can happen that the apparatus in use slides from the hand of the user; in this case, because the actuating finger piece remains locked in switched position, the apparatus continues to run and because of this, the moving working tool risks exposing the user to serious wounding.

The invention has particularly for its object to eliminate this risk and to provide an electric handheld beater-mixer of the type set forth above, which has increased safety of operation in continuous use of the motor when it is more particularly provided with the mixing accessory.

According to the invention, a spiral spring is mounted concentrically to the rotational axle of the actuating finger piece and has a so-called fixed end which is connected to said actuating finger piece and a so-called free end, and the apparatus moreover comprises a safety member having a portion forming an abutment and mounted movably in the body between a rest position in which the mixing accessory is inserted in its coupling device and in which the free end of the spring rests on the portion forming an abutment for said safety member such that the spring will be permanently in tension when the actuating finger piece occupies each of its switched positions, such that the actuating finger piece is held in its switched position by the hand of an operator against the force of the spring, and a retracted position into which it is thereafter brought by the insertion of the beating accessory in its coupling device and in which its portion forming a bearing is removed relative to the free end of the spring such that the spring will be permanently released from tension when the actuating finger piece occupies each of its switched positions in which said finger piece is held in place by the help of mechanical retention means disposed in the body, said safety member returning automatically to the rest position after withdrawal of the beating accessory.

Thanks to this retractable safety member permitting permanently tensioning the spiral spring connected to the actuating finger piece during continuous operation of the motor in the presence of the mixing accessory, it will be understood that the finger piece will return automatically to the stop position under the action of the spring if the apparatus slides from the hand of the user. Moreover, this safety member constitutes by itself a member adapted to detect either the presence of the mixing accessory, the actuating finger piece of the switch in the position of continuous operation being held by the hand, or the presence of the beating accessory, the actuating finger piece of the switch in the continuous operating position being locked.

The characteristics and advantages of the invention will appear from the following description, taken by way of non-limiting example, with reference to the accompanying drawings, in which:

FIG. 1 is a view partially in vertical cross section, of a beater-mixer according to the invention, in the stopped position and in the absence of an accessory;

FIG. 2 is a top plan view, on a reduced scale, of the beater-mixer of FIG. 1;

FIG. 3 is a view identical to FIG. 1, with the mounting of a mixing accessory;

FIGS. 4, 5 and 6 are perspective views, on an enlarged scale, of a portion of the beater-mixer of FIG. 3, showing a finger piece associated with a safety device and occupying a stop position (FIG. 4) and two successive switched positions (FIGS. 5 and 6);

FIG. 7 is a view identical to FIG. 1, with the mounting of a beating accessory; and FIGS. 8, 9 and 10 are perspective views, on an enlarged scale, of a portion of the beater-mixer of FIG. 7, showing the finger piece associated with the safety device and occupying its stop position (FIG. 8) and two successive switched positions (FIGS. 9 and 10).

The handheld beater-mixer shown in FIG. 1 comprises a body 2 of generally substantially prismatic shape, having a hollowed portion 3 which delimits a handle 5, and containing an electric drive motor 6 provided with a shaft 8 having a longitudinal axis XX' and provided in normal use with at least one so-called beating accessory such as for example a whisk 10 as shown in FIG. 7, in the lower portion 12 of the body 2 extending horizontally.

In the embodiment shown in FIG. 1, the shaft 8 of the drive motor 6 carries at its rear end 14 a rotatable coupling device 16 forming a drive which is arranged in the rear portion 18 of the body 2. In this example, the drive 16 is located facing an opening 10 provided in the rear wall 22 of the body 2 so as to define a passage opening outwardly of the body and adapted for the engagement of a mixing accessory rotating at high speed such as for example a mixing foot 25 as shown in FIG. 3. This mixing foot 25, FIG. 3, comprises a shaft 27 whose so-called front end 28, opposite the head 30 receiving a knife (not shown), is adapted to couple, for example by screwing, with the drive 16.

In this example, FIG. 1, the shaft 8 of the drive motor 6 carries at its forward end 32 an endless screw (not shown) which coacts with two helicoidal pinions each turning abut an axis YY' perpendicular to the axis XX', and which forms with the latter a reducer 34. These two helicoidal pinions are located in the front portion 36 of the body 2 and are connected respectively to two other rotatable coupling devices 38 with an axis YY', of which only one is visible in FIG. 1, which are respectively open toward two openings 40 provided in the lower wall 42 of the body 2 so as to define two passages opening from the body and adapted for the engagement of two whisks 10 of which only one is shown in FIG. 7. Each whisk 10 comprises a cylindrical rod 44 (FIG. 7), with an axis YY', whose upper end is adapted to be fixed in the corresponding coupling device 38. The two whisks 10 can be fixed in the actuating devices either one behind the other, or as in FIG. 7 side by side.

As shown in FIG. 1, in the upper portion 46 of the body 2, at the front of the latter, is arranged projectingly an actuating finger piece 48 which is rotatably mounted on a rotational axle 50 extending parallel to the axis XX' of the shaft 8 of the drive motor 6. This finger piece 48 is adapted to actuate an electric switch 52, here of the rotatable type, which places the motor 6 into and out of service and regulates its speed of rotation. To this end, the finger piece 48 for actuating the switch 52 is adapted to occupy a stop position (denoted "0" in FIG. 2) and several successive switched positions in which the switch 52 selects different levels of speed of the motor 6 corresponding to continuous operation of the motor. These different switched positions of the actuating finger piece 48 are indicated in the form of suitable reference marks, designated over all by V in FIG. 2, which are marked on the upper wall 54 of the body 2, on the same side of the stop position "0" of the actuating finger piece 48, FIG. 2.

Referring to FIG. 1, the beater-mixer moreover comprises a so-called ejection member 56 arranged vertically in the front portion 36 of the body 2 and comprising at its lower portion 57 two vertical cylindrical pins 60, of which only one is visible in FIG. 1, each associated with the corresponding coupling device 38. This ejection member 56 is mounted for movement in vertical translation, in a direction parallel to the axis YY', and is resiliently urged by resilient return means, in this instance a compression spring 62, to pass from a low position in the absence of whisks (FIG. 1) to a high position in which the pins 60 are actuated by the whisks 10 during their securement in the associated coupling device 38 (FIG. 7), and conversely, from this high position to the low position, in which the ejection member 56 frees the whisks under the action, in this embodiment, of the same actuating finger piece 48 during its stop position.

As shown in FIG. 2, the actuating finger piece 48 projects outside a clearance opening 64 provided in the upper wall 54 of the body 2. This opening 64 comprises a straight elongated portion 64a in which is adapted to move by rotation the actuating finger piece 48 to come to occupy its stopped position "0" as well as the different successive switched positions V, permitting the continuous operation of the motor, and a short rectilinear portion 64b communicating with the portion 64a and extending beyond the latter and being located at the level of the stop position of the finger piece 48; the finger piece in the stopped position is adapted to move in this portion 64b of the opening 64 so as to control the actuation of the ejection member 56 for the whisks.

In FIG. 1, there is designated at 66 a spiral spring of the coil compression type which is mounted concentrically with the rotation axle 50 of the actuating finger piece 48 and which has one so-called fixed end 67 connected to the finger piece by any suitable securement means, and a so-called free end 68. Of course, the spiral spring 66 could also be a resilient member of any other type of which one end is fixed to the finger piece 48 and whose other end is free.

According to the invention, the beater-mixer of FIG. 1 comprises moreover a safety member 70 having a portion forming an abutment 72 and movably mounted in the body 2 between:

a rest position (FIG. 3) in which the mixer foot 25 is coupled to the drive 16 and in which the free end 68 of the spring 66 rests against the portion forming an abutment 72 of the safety member 70 such that the spring 66 will be permanently stressed when the actuating finger piece 48 occupies each of its switched positions (see FIGS. 5 and 6), so that said finger piece 48 is held in its switched position by the hand of an operator against the force of the spring 66, see FIGS. 5 and 6;

and a retracted position (FIG. 7) to which it is brought by the mounting of the whisks 10 and in which its portion forming an abutment 72 is removed relative to the free end 68 of the spring 66 so that the spring 66 will be permanently unstressed when the finger piece 48 occupies each of its switched positions (see FIGS. 9 and 10) in which the finger piece 48 is held in place with the help of retention means indicated at 74 in FIGS. 9 and 10.

Thus, during continuous operation of the apparatus, the safety member 70 in the retracted position—in which the whisks are mounted—causes the expansion of the spring 66 such that the actuating finger piece 48 will be locked in the switched position, whilst in the rest position—in which the mixer foot is mounted—the safety member 70 causes the tensioning of the spring 66 and hence requires the user continuously to exert pressure on the finger piece 48 to hold the latter in its switched position; then, if the operating apparatus, provided with the mixer foot 25, slips from the hand of the user, the finger piece 48 automatically returns to the stopped position under the action of the spring 66, thereby quickly cutting off operation of the apparatus.

In a preferred embodiment, shown in FIGS. 4 to 6 and 8 to 10, the safety member 70 is constituted by a lever 76 swingably mounted at one of its ends about an axle 77 transverse to the axle of rotation 50 of the actuating finger piece 48, and comprising at its other end the portion forming an abutment 72 shaped as a hook. The lever 76 is actuated by control means 78 which are movably mounted in the body 2 and whose movement permitting swinging of the lever 76 from its rest position (FIG. 3) to its retracted position (FIG. 7) is subject to the emplacement of the whisks in their corresponding coupling device 38.

In this example, the control means 78 of the lever 76 comprise the ejection member 56 which coacts with the lever 76 via an eccentric mechanism 80, which in the present instance comprises a pin 81 carried by the ejection member 56 and adapted to move along a ramp forming a cam 83 provided in the lever 76, as is seen in FIGS. 4 to 6 and 8 to 10. Thus, the control means 78 of the lever are preferably of a simple construction and less expensive to the extent that they selectively cause the ejection member to act, which is conventionally used in this type of apparatus.

Moreover, the retaining means 74 (FIGS. 9 and 10) of the actuating finger piece 48 in each of its switched positions when the lever 76 is in its retracted position—the whisks are mounted—, comprise a lug 85 carried by the ejection member 56 and coacting only when the ejection member 56 occupies its upper position, with a notch 86 (FIG. 9) or 87 (FIG. 10) provided in the actuating finger piece 48 and associated with the switched position of this latter, as shown in FIGS. 9 and 10.

In the stopped position of the beater-mixer, in the absence of any accessory, as shown in FIGS. 1 and 2, the actuating finger piece 48 is in the stopped position "0" and the ejection member 56 occupies its lower position in which, on the one hand, its pin 81 is substantially at the bottom of the ramp 83 of the lever 76 and, on the other hand, its lug 85 (FIG. 4) is disengaged from the actuating finger piece 48. The ejection member 56 being in the lower position, the lever 76 occupies its rest position in which the free end 68 of the spring 66 rests against the portion forming an abutment 72 of the lever, as is seen in FIG. 4.

When the user desires to use the mixer foot 25, he couples the latter with the drive 16 (FIG. 3), the finger piece 48 being in the stopped position as shown in FIG. 4 and corresponding to the rest position of the lever 76 of FIG. 1. From this stopped position of the finger piece 48, the user can then turn the latter clockwise to cause the switch 52 to select different speeds of rotation of the continuously operating motor. By way of example, FIGS. 5 and 6 show the actuating finger piece 48 in two successive switched positions in each of which the lever 76 remains in the rest position so as to tension the spring 66, requiring the user to hold the actuating finger piece 48 manually, as shown in FIGS. 5 and 6. When the user releases the finger piece 48, the latter thus automatically returns, under the action of the spring 66 with its fixed end 67, into its stopped position as shown in FIGS. 3 and 4.

From the stopped position of FIG. 3, the mixer foot 25 can be simply withdrawn by unscrewing.

When the user then desires to use the whisks 10, the beater-mixer being in its stopped position as shown in FIG. 1, he engages each of the whisks 10 in the corresponding coupling device 38, FIG. 7. During their engagement, the free end of the shaft 44 of each whisk 10 presses the corresponding portion 60 of the ejection member 56 which moves to its upper position, against the spring 62, in which its lug 85 (FIG. 8) is engaged within the interior of the finger piece 48 in the stopped position. During this passage to the upper position of the ejection member 56, the pin 81 of the latter rises along the ramp 83 of the lever 76 and thus gives rise to swinging of the lever 76, which then occupies its retracted position in which its portion forming an abutment 72 is withdrawn relative to the free end 68 of the spring 66, which is thereafter relaxed, as shown in FIG. 7. From the stopped position of the actuating finger piece 48, best shown in FIG. 8, the user can then, as before, turn the finger piece 48 in the clockwise direction to bring the switch 52 into different positions of continuous operation. By way of example, FIGS. 9 and 10 show the actuating finger piece 48 in two successive switched positions in each of which the lug 85 is in engagement with the corresponding notch 86 (FIG. 9) or 87 (FIG. 10) of the finger piece 48, thereby locking the finger piece in position.

From the switched position of the finger piece 48 (FIG. 9 or 10), the user can thus stop the apparatus by turning the finger piece in the reverse direction to its stopped position as shown in FIGS. 7 and 8. The whisks 10 can then be freed by the ejection member 56 under the action of the actuating finger piece 48, said ejection member 56 returning to its lowered position while giving rise, because of a descent of the pin 81 along the ramp 83 of the lever 76, to the swinging in the reverse direction of the lever 76 which returns to its rest position as shown in FIG. 1.

What is claimed is:

1. Handheld electric beater-mixer adapted to drive selectively at least one so-called beating accessory (10) such as, for example, a whisk, or a so-called mixing accessory (25) turning at a high speed such as, for example, a mixer foot, comprising a body (2) containing an electric drive motor (6), two rotatable coupling devices (38, 16) connected to the shaft of the motor and adapted to receive, via respectively two engagement passages opening into the body, the beating accessory (10) and, respectively, a mixing accessory (25), and a control switch (52) for the electric motor which is actuated by an actuating finger piece (48) mounted rotatably on a rotation axle (50) so as to occupy a stopped position and several switched positions for continuous operation of the motor, characterized in that a spiral spring (66) is mounted concentrically to the rotational axle (50) of the actuating finger piece (48) and has a so-called fixed end (67) which is connected to said actuating finger piece (48) and a so-called free end (68), and in that it comprises moreover a safety member (70) having a portion forming an abutment (72) and movably mounted in the body (2) between a rest position in which the mixing accessory (25) is inserted in its coupling device (16) and in which the free end (68) of the spring (66) rests against the portion forming an abutment (72) of said safety member (70) so that the spring (66) will be continuously tensioned when the actuating finger piece (48) occupies each of its switched positions, such that the actuating finger piece (48) is held in its switched position by the hand of an operator against the force of the spring (66), and a retracted position to which it is brought by the insertion of the beating accessory (10) into its coupling device (38) and in which its portion forming an abutment (72) is removed relative to the free end (68) of the spring (66) such that the spring (66) will be continuously relaxed when the actuating finger piece (48) occupies each of its switched positions in which said finger piece (48) is held in place with the help of mechanical retention means (74) disposed in the body, said safety member (70) automatically returning to the rest position after withdrawal of the beating accessory (10).

2. Beater-mixer according to claim 1, characterized in that the safety member (70) is constituted by a swinging lever (76) comprising, at one of its ends, the portion forming an abutment (72), and actuated by a control means (78) which are movably mounted in the body and whose movement permitting the swinging of the lever (76) from its rest position to its retracted position is subject to the emplacement of the beating accessory (10) in its coupling device (38), against resilient return means (62).

3. Beater-mixer according to claim 2, in which the rotational axle (50) of the actuating finger piece (48) extends substantially parallel to the longitudinal axis (XX') of the shaft (8) of the motor (6), characterized in that the lever (76) is swingably mounted, at its other end, about an axle (77) transverse to the rotational axle (50) of the actuating finger piece (48), and in that the control means (78) comprise a so-called ejection member (56) associated with the coupling device (38) of the beating accessory, coacting with the lever (76) by an eccentric mechanism (80), and movable in vertical translation, against resilient return means (62), from a lower position in the absence of the beating accessory and corresponding to the rest position of the lever (76), to an upper position under the action of the beating accessory (10) during its emplacement in its coupling device (38) and corresponding to the retracted position of the lever (76), and conversely from this high position to the low position in which it releases the beating accessory (10), whilst the resilient return means (62) tend to return the lever (76) to its rest position.

4. Beater-mixer according to claim 3, characterized in that the eccentric mechanism (80) comprises a pin (81) carried by the ejection member (56) and adapted to move along a ramp forming a cam (83) provided in the lever (76) so as to ensure the swinging of the lever (76) toward its retracted position during vertical movement of the ejection member (56) from its low position to its upper position.

5. Beater-mixer according to claim 3, characterized in that the mechanical means (74) for retaining the actuating finger piece (48) in each of its switched positions when the lever (76) is in its retracted position, comprise a lug (85) carried by the ejection member (56) and coacting only when said ejection member (56) occupies its high position, with a notch (86; 87) provided in the actuating finger piece (48) and associated with said switched position of the finger piece (48).

* * * * *